US012573826B2

(12) United States Patent
    Godard et al.

(10) Patent No.: US 12,573,826 B2
(45) Date of Patent: Mar. 10, 2026

(54) CABLE ENTRY SYSTEM FOR ELECTRICAL ENCLOSURES

(71) Applicant: ERICO International Corporation, Solon, OH (US)

(72) Inventors: Pascal Godard, Georges Haute Ville (FR); Frederic Bizet, Chatillon d'Azergues (FR); Thierry Varillon, Villars (FR)

(73) Assignee: ERICO International Corporation, Solon, OH (US)

( * ) Notice: Subject to any disclaimer, the term of this patent is extended or adjusted under 35 U.S.C. 154(b) by 278 days.

(21) Appl. No.: 18/447,778

(22) Filed: Aug. 10, 2023

(65) Prior Publication Data

US 2024/0063619 A1     Feb. 22, 2024

Related U.S. Application Data

(60) Provisional application No. 63/399,923, filed on Aug. 22, 2022.

(51) Int. Cl.
    *H02G 3/08*     (2006.01)
    *H02G 3/06*     (2006.01)
    *H02G 1/08*     (2006.01)

(52) U.S. Cl.
    CPC ........... *H02G 3/088* (2013.01); *H02G 3/0608* (2013.01); *H02G 1/08* (2013.01)

(58) Field of Classification Search
    CPC ........ H02G 3/088; H02G 3/0608; H02G 1/08; H02G 3/10; H02G 3/12; H02G 3/22; H02G 3/24; H02G 3/28; H02G 3/286; H02G 3/30; H02G 3/36

USPC ....... 174/650, 668, 152 G, 153 G, 151, 68.1, 174/68.3, 74 R, 137, 152 R, 153 R; 16/2.1, 2.2; 277/312, 314, 607, 616
See application file for complete search history.

(56) References Cited

U.S. PATENT DOCUMENTS

| | | | |
|---|---|---|---|
| 3,737,558 A | 6/1973 | Seaquist | |
| 4,538,819 A | 9/1985 | Wagner et al. | |
| 5,408,740 A | 4/1995 | Dee | |
| 5,487,680 A * | 1/1996 | Yamanashi .......... | H01R 13/743 439/567 |
| 6,149,164 A | 11/2000 | Kreutz | |
| 6,203,343 B1 | 3/2001 | Chevassus-More et al. | |
| 6,353,184 B1 | 3/2002 | Daoud | |

(Continued)

FOREIGN PATENT DOCUMENTS

| | | |
|---|---|---|
| CN | 201732880 U | 2/2011 |
| EP | 1880792 B1 | 6/2010 |

(Continued)

*Primary Examiner* — Angel R Estrada
(74) *Attorney, Agent, or Firm* — Quarles & Brady LLP

(57)     ABSTRACT

Connectors and methods for providing a seal between a conductor and a wall of an electrical enclosure that includes an opening to receive the conductor therethrough and a method for providing. A connector can include a sheath configured to surround the conductor along a length of the conductor and an anchor structure internal to the sheath. The anchor structure can include fastener openings arranged to receive a plurality of fasteners that extend through the wall and through material of the sheath, to couple the sheath to the electrical enclosure with the material of the sheath between the anchor structure and the wall of the electrical enclosure to provide a seal.

19 Claims, 7 Drawing Sheets

(56) References Cited

U.S. PATENT DOCUMENTS

| | | | | |
|---|---|---|---|---|
| 6,600,105 | B2 * | 7/2003 | Nakata | H01R 13/743 174/152 G |
| 7,434,814 | B2 * | 10/2008 | Kumakura | F16L 5/10 174/152 G |
| 7,462,785 | B1 | 12/2008 | Davis et al. | |
| 7,476,801 | B1 | 1/2009 | Davis et al. | |
| 7,568,314 | B2 | 8/2009 | Collins | |
| 7,586,036 | B2 | 9/2009 | Davis et al. | |
| 7,641,271 | B1 * | 1/2010 | Haydin | B60R 16/0222 16/2.1 |
| 7,723,622 | B2 * | 5/2010 | Dukes | H02G 3/22 16/2.2 |
| 7,871,079 | B2 | 1/2011 | Dukes et al. | |
| 7,931,475 | B2 | 4/2011 | Kim et al. | |
| 7,954,287 | B2 | 6/2011 | Bravo et al. | |
| 7,954,776 | B2 | 6/2011 | Davis et al. | |
| 8,183,475 | B2 | 5/2012 | Dukes et al. | |
| 8,502,079 | B2 * | 8/2013 | Shitamichi | B60R 16/0222 174/152 G |
| 8,704,098 | B2 | 4/2014 | Agusa | |
| 8,803,006 | B2 * | 8/2014 | Imahori | H01R 13/65912 439/271 |
| 8,916,777 | B2 | 12/2014 | Waterland, III et al. | |
| 9,033,748 | B2 | 5/2015 | Ramey et al. | |
| 9,859,699 | B2 | 1/2018 | Panfil et al. | |
| 9,875,824 | B2 | 1/2018 | Oga et al. | |
| 9,947,435 | B2 * | 4/2018 | Oka | H02G 3/0406 |
| 10,128,584 | B2 | 11/2018 | Kim | |
| 10,243,191 | B2 | 3/2019 | Mattmuller et al. | |
| 10,439,383 | B2 | 10/2019 | Czibur et al. | |
| 11,170,913 | B2 | 11/2021 | Ogue et al. | |
| 11,177,056 | B2 | 11/2021 | Ogue et al. | |
| 11,320,067 | B2 | 5/2022 | Short | |
| 11,488,742 | B2 | 11/2022 | Dawson et al. | |
| 11,605,906 | B2 | 3/2023 | Robicheau et al. | |
| 11,735,335 | B2 * | 8/2023 | Okada | H01B 7/0266 174/135 |
| 2002/0138942 | A1 | 10/2002 | Sato et al. | |
| 2013/0118764 | A1 | 5/2013 | Porter | |
| 2016/0318464 | A1 | 11/2016 | Oohira | |
| 2018/0079374 | A1 | 3/2018 | Nakai et al. | |
| 2020/0235498 | A1 | 7/2020 | Robicheau et al. | |
| 2021/0134480 | A1 | 5/2021 | Dawson et al. | |
| 2022/0007529 | A1 | 1/2022 | Tian et al. | |
| 2022/0243842 | A1 | 8/2022 | Short | |

FOREIGN PATENT DOCUMENTS

| | | |
|---|---|---|
| EP | 2763243 B1 | 6/2017 |
| FR | 2397723 A1 | 2/1979 |
| FR | 3012659 B1 | 3/2017 |
| JP | 4759689 B2 | 8/2011 |

* cited by examiner

132

144  142        6

144  142

140  A

6

140

132

148b

146

A ————→ A

D

148a

CABLE ENTRY SYSTEM FOR ELECTRICAL ENCLOSURES

CROSS-REFERENCE TO RELATED APPLICATIONS

This application claims priority under 35 U.S.C. § 119 from U.S. Provisional Application No. 63/399,923, filed Aug. 22, 2022, titled "Cable Entry System for Electrical Enclosures," and is incorporated herein by reference in its entirety.

BACKGROUND

Electrical enclosures can include openings therein for passing conductors that conduct power between electrical components of an electrical system therethrough. Openings in an electrical enclosure can also provide an entry point for dust and water into the electrical enclosure, which can damage or degrade the performance of electronics and electrical terminations within the enclosure.

SUMMARY

The present disclosure relates to cable entry systems for protecting electrical enclosures against fluid and dust entry.

Some examples of the present disclosure provide a connector for providing a seal between a conductor and a wall of an electrical enclosure that includes an opening to receive the conductor therethrough. The connector can include a sheath configured to surround the conductor along a length of the conductor and an anchor structure internal to the sheath. The anchor structure can include fastener openings arranged to receive a plurality of fasteners that extend through the wall and through material of the sheath, to couple the sheath to the electrical enclosure with the material of the sheath between the anchor structure and the wall of the electrical enclosure to provide a seal.

In another example, the present disclosure can provide a method of providing a seal between a wall of an electrical enclosure and, selectively, one or more of a first conductor having a first conductor cross-sectional area or a second conductor having a second conductor cross-sectional area different from the first conductor cross-sectional area. The method can include installing, at an opening of a wall of an electrical enclosure, a sheath with a tapering structure including a first tier having a first tier cross-sectional area and being integrally formed with a second tier having a second tier cross-sectional area. The second tier cross-sectional area can be larger than the first tier cross-sectional area and the first tier can be removable from the sheath to provide unobstructed access to the second tier. The method can further include extending one or more of the first conductor or the second conductor through the sheath into the interior of the electrical enclosure and securing the sheath to the wall of the electrical enclosure with an anchor ring nested within the sheath, so that material of the sheath is compressed between the anchor ring and the wall to form a seal between the sheath and the wall.

In another example, a method of providing a seal between a conductor with an oblong rectangular cross-section and a wall of an electrical enclosure can be provided. The method can include securing a sheath of a connector to the wall of the electrical enclosure using fasteners inserted through the wall of the electrical enclosure and into the sheath, inserting the conductor into a receiving end of the sheath, and applying a flexible sealing material around an interface between the conductor and the sheath at the receiving end to seal the interface. The receiving end can have an oblong rectangular cross-section substantially equal in size to the oblong rectangular cross-section of the conductor.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
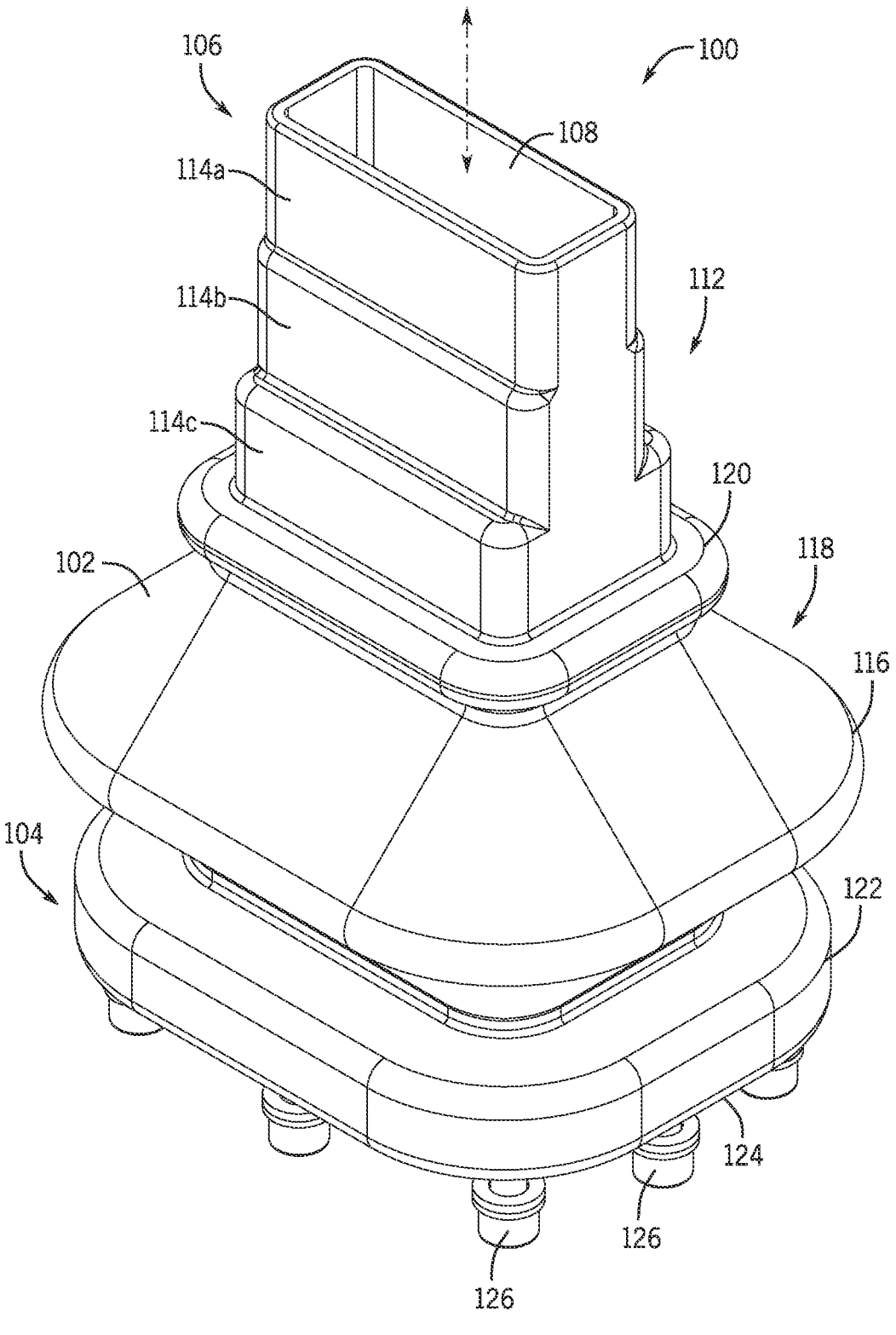
FIG. 1 is an isometric view of a connector for providing a sealed entry of an electrical conductor through a wall of an electrical enclosure according to some embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of" For example, a list of "one of A, B, or C" indicates options of: A, but not B and C; B, but not A and C; C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

Also as used herein, unless otherwise limited or defined, "integral" and derivatives thereof (e.g., "integrally") describe elements that are manufactured as a single piece without fasteners, adhesive, or the like to secure separate components together. For example, an element stamped or cast as a single-piece component from a single piece of sheet metal or a single mold (etc.), without rivets, screws, or adhesive to hold separately formed pieces together, is an integral (and integrally formed) element. In contrast, an element formed from multiple pieces that are separately formed initially, then later connected together, is not an integral (or integrally formed) element.

Unless otherwise specified or limited, the terms "about" and "approximately," as used herein with respect to a reference value, refer to variations from the reference value of ±15% or less (e.g., ±10%, ±5%, etc.), inclusive of the endpoints of the range. Similarly, the term "substantially equal" (and the like) as used herein with respect to a reference value refers to variations from the reference value of less than ±30% (e.g., ±20%, ±10%, ±5%) inclusive. Where specified, "substantially" can indicate in particular a variation in one numerical direction relative to a reference value. For example, "substantially less" than a reference value (and the like) indicates a value that is reduced from the reference value by 30% or more, and "substantially more" than a reference value (and the like) indicates a value that is increased from the reference value by 30% or more. In particular, "substantially equal in size" and the like indicates that referenced two dimensional shapes have substantially equal areas and referenced three dimensional shapes have substantially equal volumes, with substantially equal maximum dimensions along axes corresponding to the two or three dimensions, respectively.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

In some contexts, it may be useful to electrically link a voltage transformer to a power distribution module or otherwise provide for transmission of low voltage (e.g., 1000 V or less) electrical power between different electrical modules. Conductors can be used to supply power between a transformer and a power distribution module, or between the different electrical modules. In some cases, the conductors can have cross-sectional areas and profiles as may be advantageous for supplying a large amount of power between electrical modules. For example, conductors of a power supply system can have a rectangular cross-section. In alternating current (AC) applications, a non-square rectangular cross-section can provide a larger outer surface area than a conductor with a circular cross-section of the same cross-sectional area. The increase in surface area takes advantage of the "skin effect," which is the tendency of AC to be distributed with the greatest current density near the outer surface of the conductor and decreasing exponentially inward from the outer surface. Thus, a conductor with a non-square rectangular cross-section can effectively have a greater current carrying capacity than a conductor with a circular cross-section of the same cross-sectional area.

Electrical components such as a transformer, a switchboard, a power supply, and other electrical modules can require protection against dust and against moisture including water. However, openings in electrical components required for entry of electrical conductors can also provide an opening for water, dust, and other undesirable particulate or liquid matter that may damage, or otherwise degrade performance of, an electrical system. Accordingly, systems according to the present disclosure can provide improved protection against water and dust intrusion at entry points for electrical conductors (e.g., of rectangular or other cross-sections).

Conventional systems for protecting against dust and water entry into electrical components can be designed to accommodate conventional conductors, including, for example, conductors having a circular cross-sectional profile. Some conventional systems include sealing an entry by extending a conductor through a water resistant connector. For example, a cable can extend through a connector with a compressible nylon insert, which can be secured to the electrical component at an entry in the electrical component and tightening of the connector can compress the nylon insert (e.g., via a threaded nut on the connector) to provide a degree of sealing. However, conventional systems, including the system described, may not be adaptable to provide sealing protection for entries of conductors having different cross-sectional profiles, including the rectangular cross-section described above (e.g., because of the reliance on circular nuts as discussed above). Further, bends in conductors of conventional systems—including with circular conductors—may compromise protection against water or dust entry, as the bending may break a seal in the connector and provide an entry point into which dust or water can enter.

Some embodiments of the disclosed subject matter provide water and dust proof conductor entry systems that can accommodate conductors of different cross-sectional profiles, including rectangular profiles. For example, examples of the disclosed entry system can include a flexible sheath for a conductor, which can have a bottom portion that, when installed, is proximate to the electrical component for which dust/water protection is to be provided, and a top portion that, when installed, extends outwardly from the electrical component. The bottom portion can include an anchor structure (e.g., embedded in the sheath), that can securely engage fasteners (e.g., screws) to secure the sheath to the electrical component. When secured to an electrical component, the anchor structure can create a seal about a periphery of the sheath's engagement with a surface of the electrical component.

In some examples, a sheath can include contoured (e.g., curvilinearly tapered) exterior profiles that can help to provide flexibility for the sheath or other benefits (e.g., improved water shedding). For example, a sheath can include a bellows section with one or more corrugations between an opening in the sheath that receives a conductor and an opposing portion of the sheath at which the sheath is secured to the relevant electrical component. For example, a sloped (e.g., linearly angled) corrugation on a sheath can allow the sheath to readily flex to accommodate different angular orientations of a conductor without introducing excessive stress on a connection between the conductor and the sheath or on a connection between the sheath and the electrical component.

In some examples, a sheath can include structures to accommodate different sizes of conductors. For example, a top portion of a sheath can include a plurality of tiered portions, with each of the plurality of tiered portion having a different cross-sectional area (i.e., transverse to an insertion direction of a corresponding conductor). In some examples, smaller tiered portions can be removed (e.g., cut away) to provide larger entry points for a conductor through the larger tiered portion. Therefore, the differently sized tiers can provide differently sized openings in the top portion of the sheath configured to closely encircle the conductor extending therethrough, based on the size of the conductor.

In some examples, once a conductor is inserted through a sheath, it can be secured to the sheath, and the top portion of the sheath can be sealed against dust or water entry. For example, a conductor can be secured to a sheath and the corresponding opening in the sheath sealed against dust and water entry through the use of self-fusing tape (or other flexible sealing materials) that can be wrapped around the conductor and secured around the interface of the sheath and the conductor. This can provide a seal that can be compliant with standards for securing electrical components, for example, IP55.

In some examples, a sheath can be formed from flexible material, including polyvinyl chloride ("PVC") which can allow the sheath to bend with a conductor without compromising the seal. In some cases, a sheath can be formed using other flexible materials, for example, silicone.

In some examples, a sheath can include a flexible portion and can include an anchor structure that can improve sealing contact between the sheath and an enclosure wall. For example, a PVC or other flexible sheath can be formed to include (e.g., softened and then deformed to surround) a body of a different material (e.g., a more rigid plastic or other more rigid material). In some cases, such a body can be configured to provide fastened engagement between the sheath and an enclosure wall. For example, an anchor body of a first more rigid plastic can support posts (e.g., threaded posts) that can extend through corresponding openings in an enclosure wall (e.g., that surround a main opening for the conductor), or can support threaded structures (e.g., integral threads, or separate nuts nested into the anchor body) or other female connectors. In some cases, an anchor body can provide a relatively rigid structure to compress a sealing material (e.g., the flexible material of the associated sheath) during installation and thus provide an improved seal at an enclosure wall. For example, the sheath can be installed so that a flexible structure (e.g., wall) of the sheath is between an anchor body and an enclosure wall. Accordingly, in some examples, peripherally-arranged threaded (or other) fasteners can be tightened to compress the flexible structure of the sheath between the enclosure wall and the anchor body and thus ensure a highly effective seal at the associated conductor entry.

Figure 7:
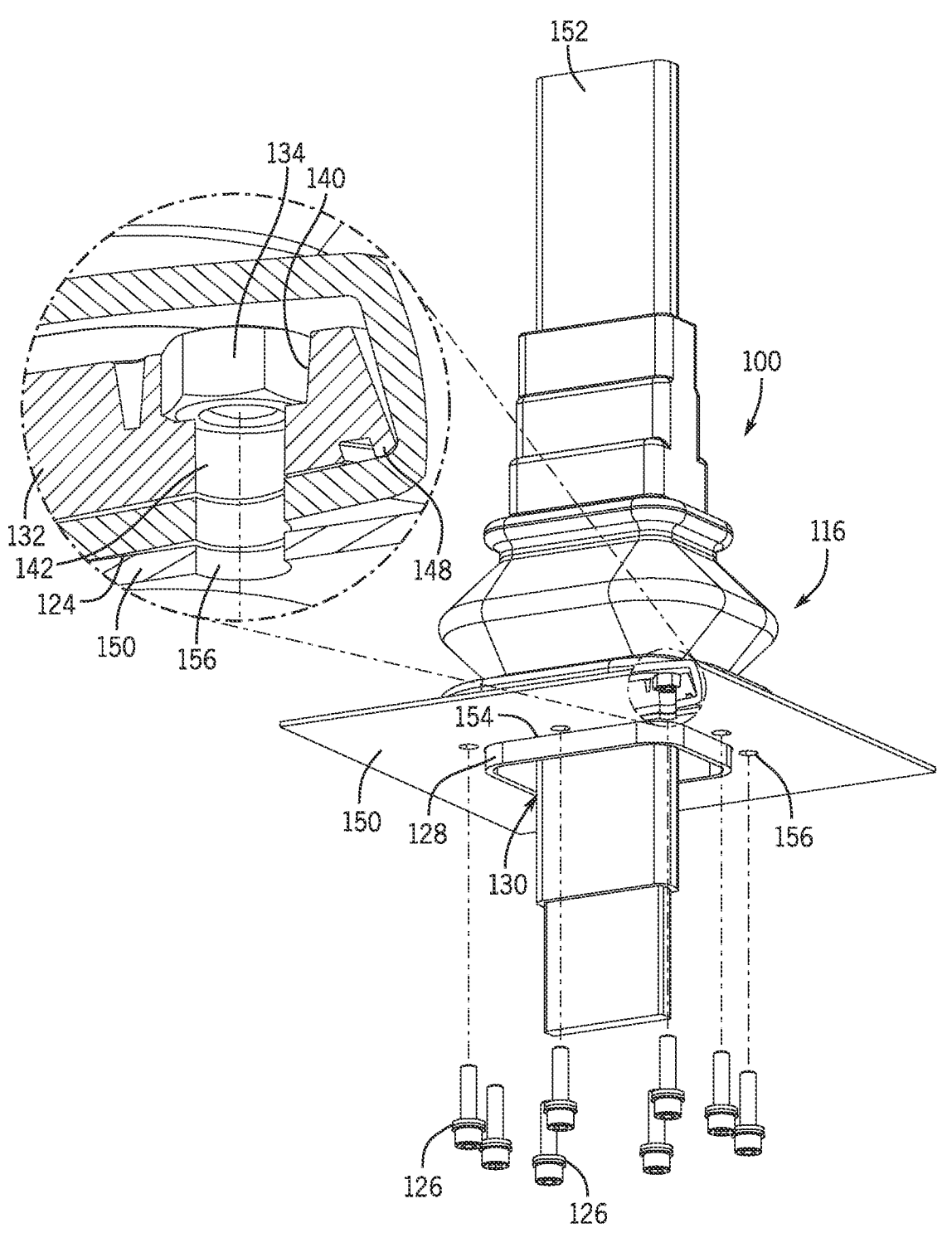
FIG. 7 is a bottom front isometric view of the connector of FIG. 1 secured to a wall of an electrical enclosure, with a detail view illustrating the interaction between the sealing lip of the anchor structure, a sealing surface of the sheath, and the wall of the electrical enclosure.

In this regard, FIG. 1 illustrates a connector 100, which, as discussed above, can be used to secure a conductor (e.g., conductor 152 shown in FIGS. 7 through 8c) to an electrical enclosure (e.g., a wall 150 of an electrical enclosure shown in FIG. 7). The connector 100 can include a sheath 102. In the illustrated embodiment, the sheath 102 is a flexible body. In some embodiments, the sheath 102 can be formed from PVC or other suitably flexible material and could thus have flexible properties for accommodating movement of a conductor inserted therethrough. As appropriate for relevant installations, the material for the sheath 102 can be flame retardant, can withstand a maximum temperature of up to 140 degrees Celsius, or can be resistant to acid, solvent, ultraviolet radiation, etc. In other embodiments, other flexible materials can be used, including silicone or various thermoplastic elastomers (TPE), for example. In other embodiments, a sheath of a connector (e.g., the connector 100) can be rigid.

In some embodiments, a sheath for a connector can be shaped to fully surround a conductor, defining an open interior passage that extends between an opening at a receiving end, and an opening at an attachment end of the connector. Accordingly, in the illustrated embodiment, the sheath 102 includes an attachment end 104 that is proximate to an electrical enclosure when the connector 100 is installed. The illustrated sheath 102 also includes a receiving end 106 opposite the attachment end 104. The receiving end 106 can define an opening 108, into which a conductor (e.g., the conductor 152 shown in FIGS. 7-8c) can be inserted in an insertion direction A. As shown, the opening 108 defines an oblong rectangular cross-sectional profile that includes rounded corners, as can accommodate conductors having a corresponding rectangular cross-section. In other embodiments, an opening at a receiving end of a connector could have other cross-sectional profiles for receiving conductors having different cross-sectional shapes. For example, an opening at a receiving end of a connector could define a circular profile, or an oval profile, or a square profile, etc.

The connector 100 is configured to secure conductors with different oblong rectangular cross-sectional areas. For example, as illustrated in FIG. 1, the receiving end 106 can include a tapering structure 112, which can progressively taper in a direction parallel to the insertion direction, so that a cross-sectional area of the tapering structure 112 is smallest at the opening 108, and the cross-sectional area increases along the insertion direction (e.g., generally in discrete steps as shown, or continuously in other examples). Thus, if the cross-sectional area of the tapering structure is too small for a conductor at the opening 108, a portion of the tapering structure can be removed (e.g., a peripheral cut can be performed to sever a section of the tapering structure 112), and the cross-sectional area of the opening 108 can thereby be increased (but at a new location further along the insertion direction A).

In some embodiments, the tapering structure 112 can include a tiered structure including a plurality of tiers 114 (as shown in FIG. 1), each tier having a different cross-sectional area, as measured along a plane perpendicular to the insertion direction A, and configured to be substantially equal to a pre-determined cross-sectional area of a conductor. For example, as illustrated, a first tier 114*a*, closest to opening 108 can define a first cross-sectional area, which can be smaller than a second cross-sectional area of a second tier 114*b*. The second cross-sectional area of the second tier 114*b* can in turn be smaller than a third cross-sectional area defined by a third tier 114*c*. In this configuration, the appropriately sized tier can be based on the size of the conductor (e.g., a conductor like the conductor 152 shown in FIG. 7) being installed. For example, if the conductor has a cross-sectional area substantially equal to the cross-sectional area of the second tier 114*b*, the first tier 114*a* can be removed to provide unobstructed access to the second tier 114*b* (i.e., access without the cross-sectional restriction of the smaller cross-sectional area of the removed tier). In some embodiments, a tapering structure can have only two tiers, or more than three tiers. In other embodiments, a tapering structure may not include tiers. For example, a tapering structure can instead angle continuously inwardly toward a distal end that defines a receiving opening for a conductor.

In some cases, during or after installation, conductors can extend from an electrical enclosure at an angle, including due to required arrangements of the conductors at hard-to-reach electrical components disposed remotely from an electrical enclosure (e.g., switch cabinets arranged remotely from a transformer within an industrial building). Accordingly, some connectors as disclosed herein can be configured to accommodate different bending angles of a conductor extending therethrough.

For example, as further illustrated in FIG. 1, in addition to being constructed from a flexible material, the sheath 102 can be shaped to allow flexibility for a conductor to extend therethrough in different directions. For example, as shown, the sheath 102 includes a bellows section 116 between the receiving end 106 and the attachment end 104. A portion of the bellows section 116 along an inner radius of a bend can collapse, while an opposite side of the bellows section 116 can expand along an outer radius of a bend to allow the sheath 102 to bend along with a bend in a conductor.

In the illustrated example, the bellows section 116 can include a corrugation 118 disposed at an end of the bellows section 116 proximate the receiving end 106. As illustrated, the corrugation 118 can include an expanded cross-width area along upper and lower structures, to a maximum width area at apex 118A, with upper and lower bounding grooves extending along upper and lower edges of the corrugation 118 proximate flanges 120, 122. Thus structured, the corrugation 118 can facilitate bending of the sheath 102, in conjunction with the other geometries of the bellows section 116. In other examples, a differently shaped corrugation can be used (e.g., differently angled or curved moving toward a maximum or minimum width). In some examples, different numbers of corrugations can be used (e.g., in an accordion section with uniform maximum and minimum width).

In some examples, features can be provided on a receiving end of a connector to facilitate sealing the entry at the receiving end. For example, as shown in FIG. 1, the peripheral attachment flange 120 can be positioned on the sheath 102 (e.g., between the corrugation 118 and the tapering structure 112, in the example shown), and can define a peripheral protrusion extending outwardly along a portion of the sheath 102. As shown, the attachment flange 120 can extend fully around the perimeter of the sheath 102, although other configurations are possible. The attachment flange 120 can provide an attachment surface for attaching a sealing material (e.g., flexible sealing material 136 shown in FIGS. 8*a*-8*c* and discussed further below) to seal an interface between a conductor and the opening 108. In some examples, an attachment flange (not shown) can be included as a corrugation of a bellows section (e.g., the bellows section 116).

The attachment end 104 of the connector 100 can also include features for interfacing with a wall of an electrical component or enclosure (e.g., the enclosure wall 150 shown in FIG. 7), to at least partially seal the interface of the connector 100 and the enclosure wall 150 against the entry of dust or water. For example, as shown in the illustrated embodiment, the attachment end 104 of the sheath 102 includes a sealing flange 122 comprising a protruding portion that extends outwardly around a periphery of the sheath 102. The sealing flange 122 defines a sealing surface 124 that is configured to contact the enclosure wall 150 when the connector 100 is installed, and thus form a seal between the connector 100 and the enclosure wall 150.

Figure 4:
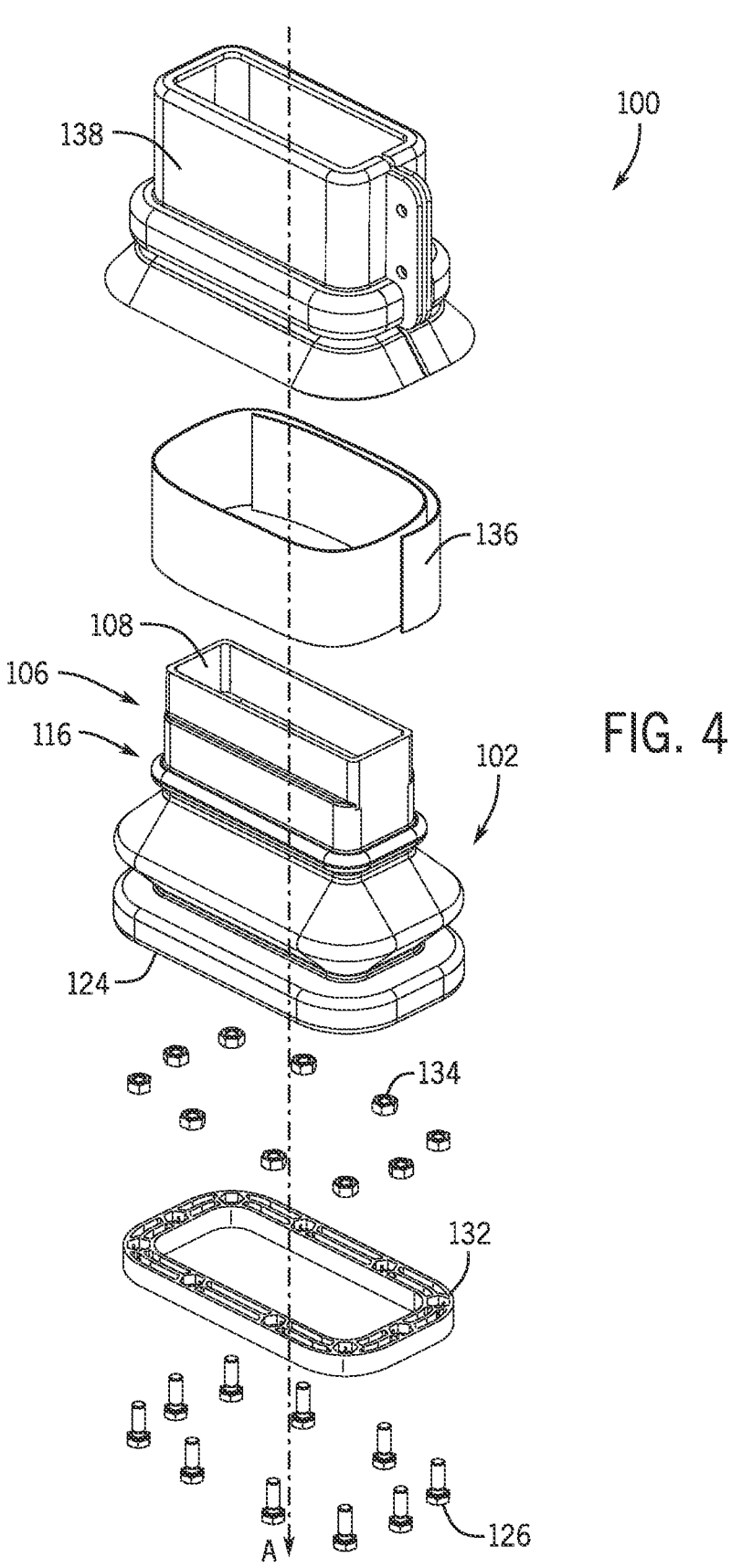
FIG. 4 is an exploded view of the connector of FIG. 1, further showing a flexible sealing material and a cover for the connector according to some embodiments.

As further illustrated in the figures, a plurality of fasteners 126 (e.g., bolts or screws) can be provided to secure the connector 100 to the enclosure wall 150. Each of the plurality of fasteners 126 can extend through a corresponding hole 156 (shown in FIG. 7) in the enclosure wall 150, into the sealing flange 122 to secure the connector 100 to the enclosure wall 150. As shown in the figures, the fasteners do not extend to the outside of the sheath 102. In some embodiments, the plurality of fasteners 126 engage another plurality of fasteners (e.g., nuts 134 as shown in FIGS. 4 and 7) to secure the connector 100 to the enclosure wall 150. In some embodiments, tightening the plurality of fasteners 126 produces a seal between the sealing surface 124 and the enclosure wall 150.

Figure 2:
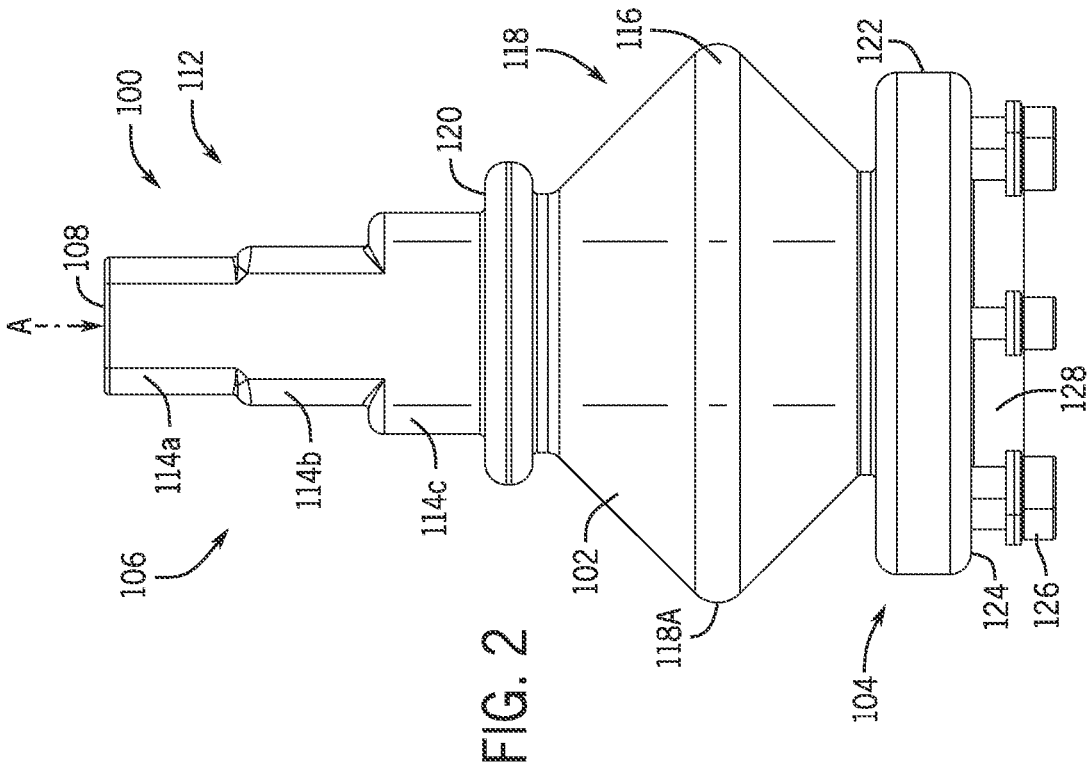
FIG. 2 is an elevation view of the connector of FIG. 1.

As illustrated in FIG. 2, the attachment end 104 of the connector 100 can include a skirt 128 that can extend from the attachment end 104 along the insertion direction A away from the receiving end 106. The skirt 128 can be configured to extend through an aperture 154 (shown in FIG. 7) of the enclosure wall 150, to provide additional protection for the conductor 152 (shown in FIG. 7) and electrical elements within the electrical enclosure against the entry of dust and water. In some embodiments, the skirt 128 can be integrally formed with the sheath 102. In other embodiments, the skirt 128 can be a separate component of the connector 100 that can be attached to the sheath 102.

Figure 3:
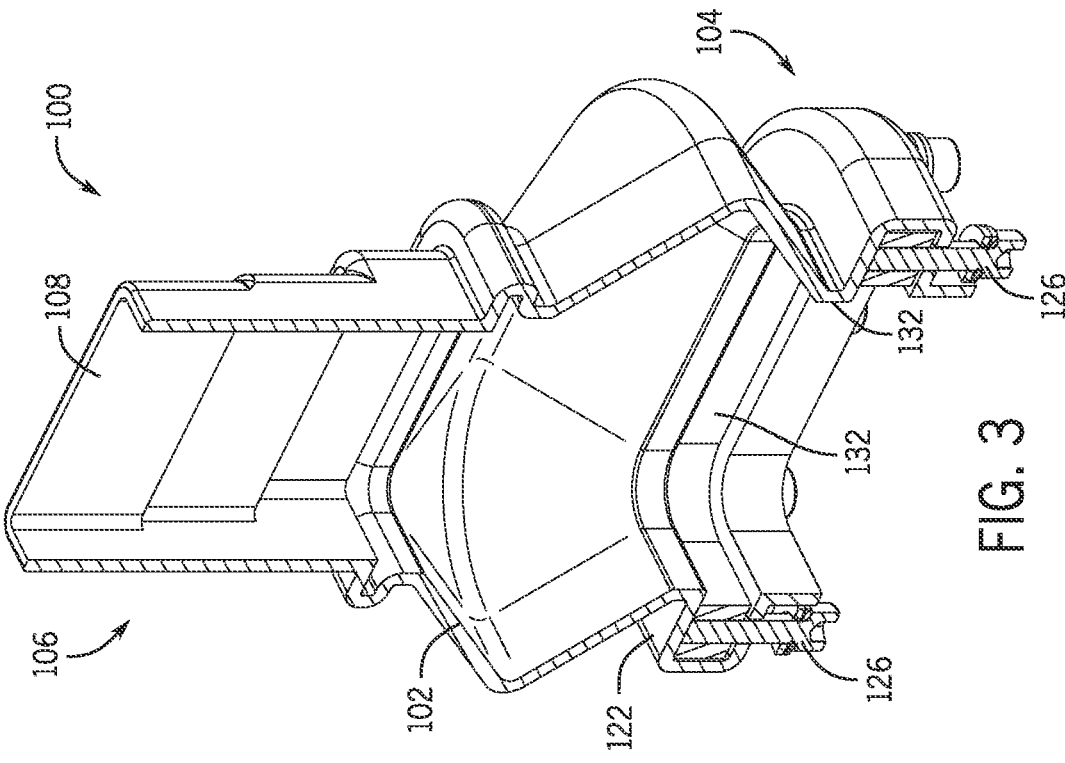
FIG. 3 is an isometric section view of the connector of FIG. 1, showing an anchor structure within a sheath of the connector.

As shown in FIG. 3, the attachment end 104 of the sheath 102 can define an opening 130 opposite the opening 108 on the receiving end 106. With the connector 100 secured to the enclosure wall 150, the conductor 152 (shown in FIG. 7) can extend through the enclosure wall 150 through the opening 130. In some embodiments, as shown, the opening 130 can define a rectangular cross-sectional area which can include generally rounded corners. The rectangular cross-sectional area of the opening 130 can be similar in shape to the cross-sectional profile of the conductor 152. In other embodiments, the opening 130 can have a cross-sectional area of a different shape, for example, a circle, a triangle, a square, or an oval. In some examples, the opening 130 for passage of the conductor 152 through the enclosure wall 150 can be defined by or otherwise extend through the skirt 128 to protect the conductor 152 from edges of the aperture 154 in the enclosure wall 150.

The connector 100 can also include an anchor element or structure 132 to provide a structure that can further facilitate attachment of the connector 100 to the enclosure wall 150, or to enhance a seal between the sheath 102 and enclosure wall 150. As shown in FIG. 3, for example, the anchor structure 132 can be a rectangular anchor ring nested within the sheath 102. In particular, as also shown in FIG. 7, the anchor structure 132 (e.g., as a rectangular anchor ring) can be sized and shaped to fit within an internal recess of the sealing flange 122 that includes material of the sheath arranged to provide a seal with the enclosure wall 150 (as further discussed below). In such a case, for example, when inserted in the sealing flange 122, the anchor structure 132 can provide a more rigid structure to the sealing flange 122.

As further illustrated in FIG. 3, the anchor structure 132 can provide a structure into which the fasteners 126 can be inserted. In some embodiments, the anchor structure 132 can include a fastening feature (e.g., an integrally formed threaded portion as shown in FIG. 3 or a captive nut (e.g., the nuts 134 shown in FIGS. 4 and 7)) for receiving a corresponding feature on the fasteners 126.

In some embodiments, including the embodiment shown, the anchor structure 132 can be rigid, and can thus enhance a seal between the connector 100 and the enclosure wall 150. For example, tightening the plurality of fasteners 126, 134 pulls the anchor structure 132 toward the enclosure wall 150 and thereby urges a peripheral lip 148 (discussed further below) of the anchor structure 132 into the material of the sheath 102 and compresses the sealing surface 124 to enhance the seal. In some embodiments, the anchor structure 132 can be formed from a material that is different than the material of the sheath 102. In some embodiments, for example, the anchor structure 132 can be formed from fiberglass. As shown in FIG. 4, the anchor structure 132 can generally define a rectangular profile having rounded corners. However, in other embodiments, the anchor structure 132 can define any shape that can be received within the protruding portion of the sealing flange 122.

Figure 5:
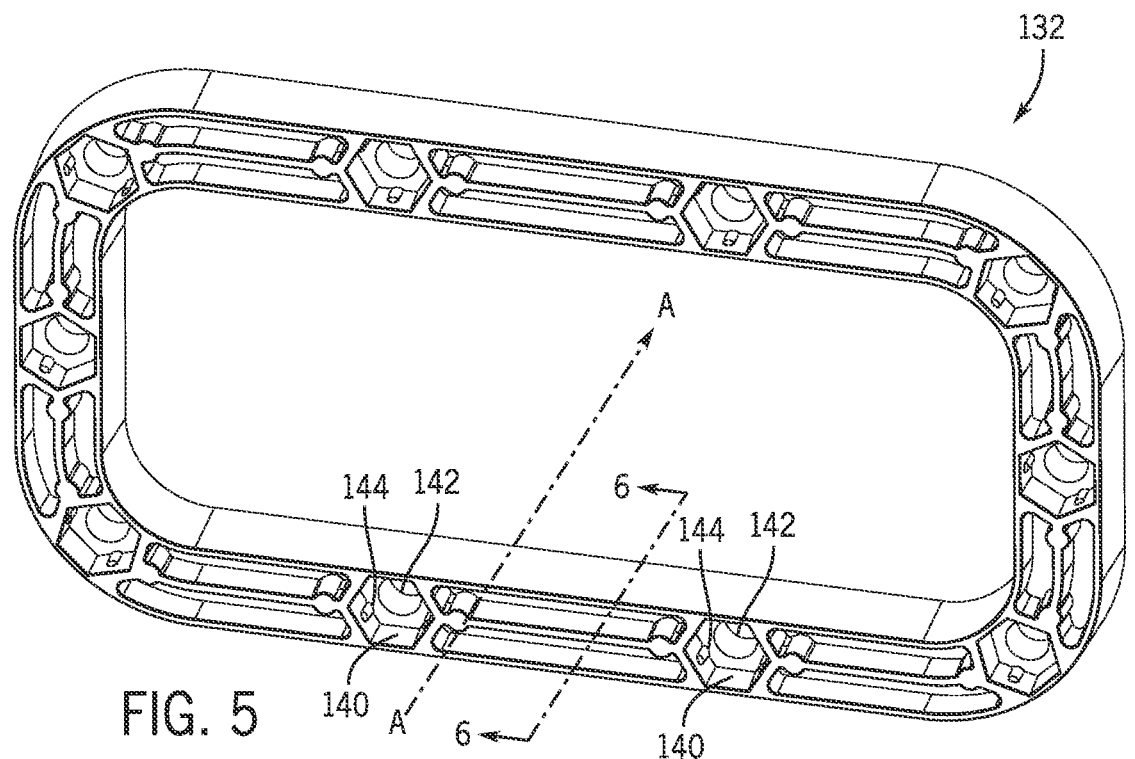
FIG. 5 is an isometric view of an anchor structure for the connector of FIG. 1 according to some embodiments.

In some examples, the anchor structure 132 can include features to receive and secure fasteners to enhance a connection and seal between the connector 100 and a wall of an electrical enclosure (e.g., the enclosure wall 150 shown in FIG. 7). For example, as shown in FIG. 5, the anchor structure 132 can include a plurality of indents 140 that are sized and shaped to receive corresponding fastening elements, e.g., as shown, the nuts 134. As shown, the indents 140 can define a hexagonal profile to match a corresponding hexagonal profile of the nuts 134. In some embodiments, openings 142 can be provided in the anchor structure 132, which can extend through the anchor structure 132 and open into a corresponding indent 140. The openings 142 can each thus allow a fastener 126 to extend through the anchor structure 132 and engage a corresponding nut 134 that is nested within a corresponding indent 140 (or vice versa). Protruding detents 144 (shown in FIG. 5) can extend into the indents 140 and can engage a nut 134 nested within the indent 140, to at least partially secure the nut 134 within the indent 140. The engagement between the protruding detents 144 and the nut 134 can provide friction opposing movement of the nut 134 in a direction parallel to the insertion direction A, so that the insertion of the fastener 126 through the nut 134 does not dislodge the nut 134 from the indent 140.

Figure 6:
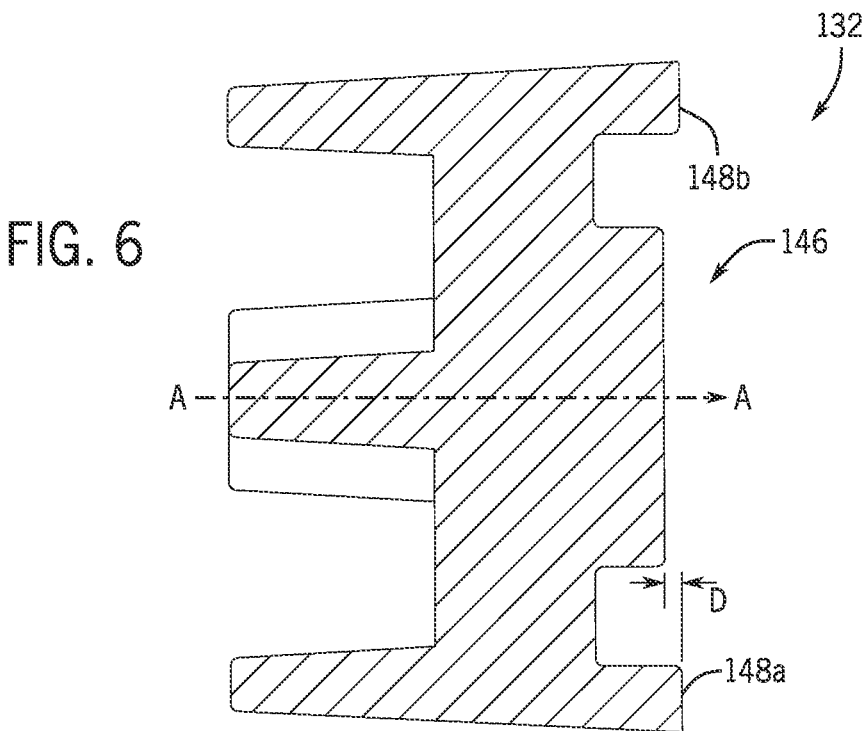
FIG. 6 is a cross-sectional view of the anchor structure of FIG. 5 along line 6-6 in FIG. 5.

Geometries of the anchor structure 132 can provide an engagement with the flexible material of the sheath 102 to advantageously concentrate a pressure on the sealing surface 124 to seal the interface between the connector 100 and the enclosure wall 150. In this regard, FIG. 6 illustrates a cross-sectional profile of a side of the anchor structure 132 along line 6-6 of FIG. 5. A lower section 146 of the anchor structure 132 can face downwardly toward the attachment end 104 of the sheath 102 when the anchor structure 132 is installed within the sheath 102. As illustrated, at least one sealing lip (here shown as a set of sealing lips including an interior sealing lip 148a and an exterior sealing lip 148b) can extend from the anchor structure 132 away from the receiving end 106 and can be continuous around a periphery of the anchor structure 132. The interior sealing lip 148a is disposed on a laterally internal edge of the anchor structure 132 (e.g., the edge closest to the interior passage of the connector 100), and the exterior sealing lip 148b is disposed along a laterally exterior edge of the anchor structure 132 (e.g., the edge furthest from the interior passage of the connector 100). In other embodiments, the anchor structure 132 can include only one sealing lip, or more than two sealing lips. As shown, the sealing lips 148a, 148b extend further in the direction of the attachment end 104 than any other portion of the anchor structure 132 by at least a distance D (i.e., the sealing lips 148a, 148b extend by a distance D that is greater than the extension of any other portion of the anchor structure 132). This ensures that pressure is concentrated at the interface of the sealing lips 148a, 148b and the sheath 102.

In some embodiments, the connector 100 can include additional elements for providing a seal at an interface of a conductor (e.g., the conductor 152 shown in FIG. 7) and the connector 100, at the receiving end 106 of the connector 100. In some cases, such elements can also help to secure the conductor 152 to the connector 100. For example, the flexible sealing material 136 (shown in FIGS. 8a through 8c) can be attached to the sheath 102 to at least partially seal the interface between the sheath 102 and the conductor 152 and, in some cases, can also secure the conductor 152 to the sheath 102. In this regard, FIG. 4 illustrates the flexible sealing material 136, which can be wrapped around the interface between the receiving end 106 and the conductor 152 to seal the opening 108 against the entry of dust or water. In some embodiments, the flexible sealing material 136 can include a self-fusing rubber electrical insulating and sealing tape or other similar wrap material. In some cases, the flexible sealing material 136 can further include an ethylene propylene rubber (EPR) coated with a temperature-stable mastic adhesive. The adhesive can thus secure the flexible sealing material 136 to the conductor 152 and to the sheath 102, both for flexible structural integrity and to provide a seal at the opening 108. In some embodiments, the flexible sealing material 136 can be a heat-shrinkable sleeve (e.g., of various known heat-shrink materials) that can be positioned over the interface of the sheath 102 and the conductor 152, and can be heat-shrunk over the interface, thus sealing the opening 108 against water or dust entry and securing the conductor 152 to the sheath 102. In some cases, using a heat shrinkable sleeve as a flexible sealing material 136 can enhance the protection of the interface between the sheath 102 and the conductor 152 to enable the system to be compliant with additional standards for securing electrical components, for example, IP66.

Figures 8A, 8B, 8C:
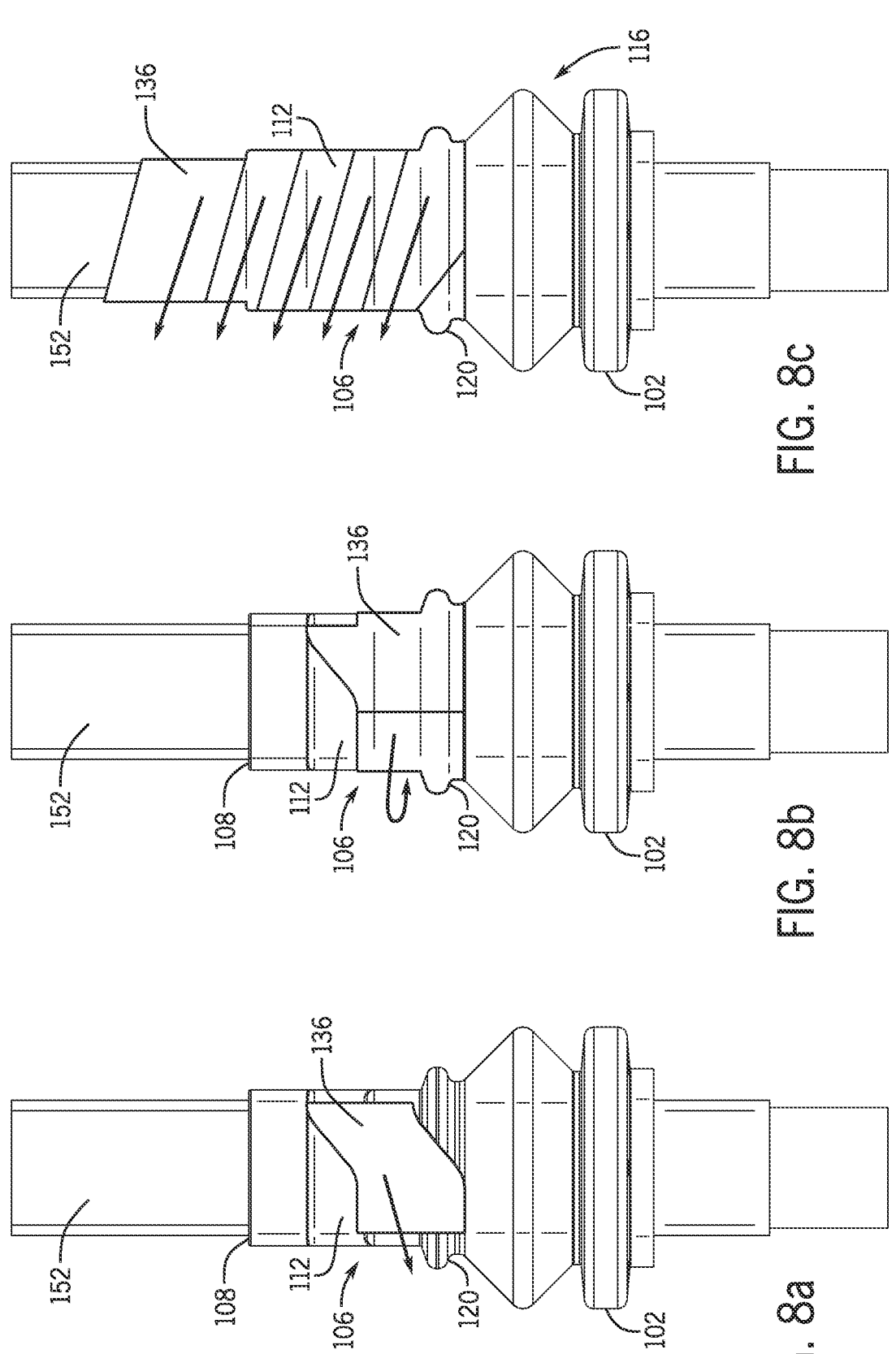
FIGS. 8a-8c are front elevation views of the connector of FIG. 1 with a conductor inserted therethrough, illustrating a method of sealing the interface between the sheath and the conductor with a flexible sealing material.

As noted above, FIGS. 8a through 8c illustrate an example of the flexible sealing material 136 being applied to the receiving end 106 of the sheath 102 and the conductor 152 to prevent entry of dust or water through the opening 108. As shown in FIG. 8a, the flexible sealing material 136 can be an adhesive tape, and a proximal end thereof can be secured to the sheath 102 at the attachment flange 120 (e.g., wrapped over the protruding edge of the attachment flange 120, so that a lower surface and protruding edge of the attachment flange 120 provides an anchoring surface for the flexible sealing material 136). As illustrated in FIG. 8b, the flexible sealing material 136 can be wound around a perimeter of the attachment flange 120, covering the attachment flange 120, and can be progressively wound around the tapering structure 112 in a direction away from the attachment end 104 of the sheath 102 to cover the interface (e.g., entire peripheral contact line) between the conductor 152 and the opening 108.

In some examples, the flexible sealing material 136 can be wound, as shown in FIG. 8c, until the material 136 completely covers the surface of the tapering structure 112. For example, as the flexible sealing material 136 is wound around the sheath 102 and the conductor 152, successive passes of the flexible sealing material 136 can overlap to create a seal between successive windings around the perimeter of the sheath 102 or the conductor 152. Thus, for example, the flexible sealing material 136 can adhere to the sheath 102 and the conductor 152 to seal the interface therebetween against the entry of dust or water at the receiving end 106 of the sheath 102, with extended securing and sealing engagement from the interface to the attachment flange 120 (e.g., at the near side of the bellows section 116).

In some embodiments, the connector 100 can include a cover 138 as shown in FIG. 4. The cover can be provided to encase the receiving end 106 of the sheath 102 to provide additional protection for the connector 100 against the entry of dust or water. For example, the cover 138 can be provided to encase the sealed receiving end 106 of the sheath 102 and the flexible sealing material 136. In the example shown, the installation of the cover 138 can improve moisture shedding and will not inhibit the flexibility of the bellows section 116.

FIG. 7 illustrates the connector 100 being installed on the enclosure wall 150, to protect and seal passage of a portion of the conductor 152 extending through the interior passage of the connector 100 and into the enclosure. As briefly discussed above, the enclosure wall 150 includes the aperture 154 through which the skirt 128 of the connector 100 extends into the electrical enclosure. The skirt 128 can operate both to add an additional protection for the enclosure against water and dust entry, and also to protect the conductor 152 from damage that could occur from the conductor 152 engaging an edge of the aperture 154 (e.g., when the conductor 152 is bent or otherwise laterally loaded exterior to the enclosure, such that the conductor 152 extends into or out of the aperture 154 obliquely to the insertion direction A (see, e.g., FIG. 1)). As illustrated, the enclosure wall 150 also include the holes 156 for receiving the plurality of fasteners 126, allowing the fasteners 126 to extend through the wall 150 into the anchor structure 132, and engage the nuts 134 to fasten the connector 100 to the wall 150. The holes 156 can be disposed around the perimeter of the aperture 154 and can be aligned with corresponding openings 142 in the anchor structure 132. As shown, the sealing lip 148 of the anchor structure can concentrate pressure on the flexible material of the sheath 102 at the sealing surface 124 when the connector 100 is secured to the enclosure wall 150, thus producing a seal that can at least partially protect against water and dust entry at the interface between the connector 100 and the enclosure wall 150.

As noted above, for example, this arrangement in particular can be useful for enclosures of transformers, relative to rectangular or other high current capacity conductors. However, use with other enclosures or other conductor profiles is also possible. Additionally, while the connector 100 is shown in a vertical orientation in the illustrated embodiment, one of skill in the art would appreciate that the connector 100 can be secured to a wall in different orientation (e.g., the connector 100 can be installed on a horizontal surface, a vertical surface, or an inclined surface), and can thus provide protection against the entry of dust or water into openings that are oriented differently than the aperture 154 illustrated in FIG. 7.

As also partly shown in FIGS. 3 and 7, certain components of the connector 100 can be advantageously shielded from the surrounding environment with the connector 100 in an installed configuration. For example, the nuts 134 and the anchor structure 132 are enclosed within the connector 100 by the sealing flange 122 so as to be protected from corrosion or other adverse environmental effects. Parts of the screw fasteners 126 are also enclosed within the sealing flange 122 and the anchor structure 132, with similar beneficial effect. Further, the remainder of the fasteners 126 are protected by the enclosure wall 150 and by the seal formed between the sealing surface 124 and the enclosure wall 150 around the opening 130.

Figure 9:
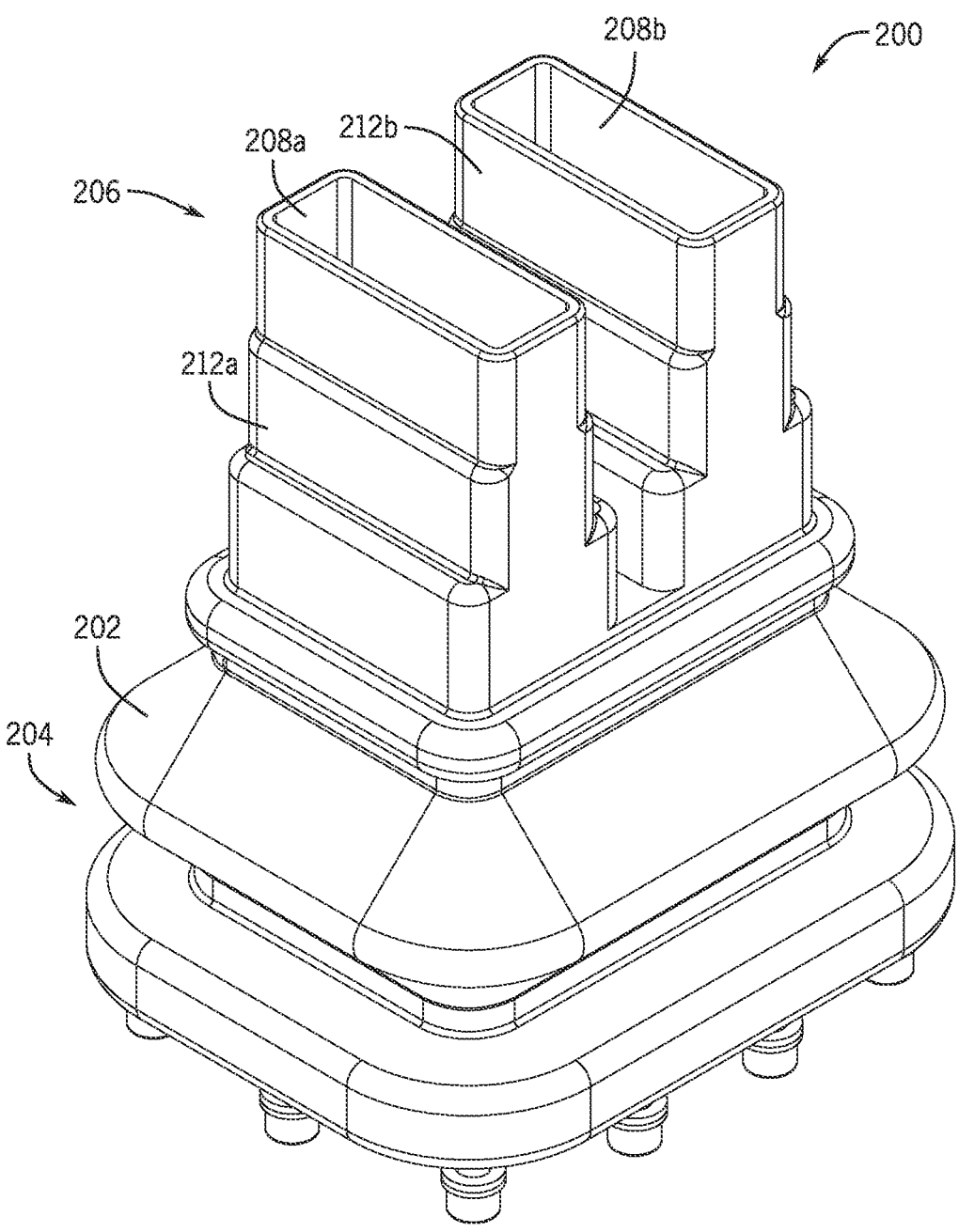
FIG. 9 is an isometric view of a connector including entries for two conductors, according to some embodiments.

In some embodiments, a connector can accommodate the entry of multiple conductors into an electrical enclosure. In this regard, then, FIG. 9 illustrates a connector 200 which is generally similar to the connector 100 and includes similar numbering for similar components. In the illustrated embodiment, the connector 200 includes a sheath 202 having an attachment end 204 a receiving end 206. Connector 200 includes two tapering structure 212a, 212b at the receiving end 206, each tapering structure 212a, 212b being sized and configured to receive a conductor (e.g., the conductor 152) in a corresponding opening 208a, 208b therein. Thus, connector 200 can facilitate the entry of two conductors 152 into an electrical enclosure and can provide similar sealing systems for interfaces at the attachment end 204 and the receiving end 206 as described with respect to connector 100. In some embodiments, a connector can include more than two tapering structures, to receive more than two conductors. Likewise, although the connector 200 is shown with a single-corrugation bellows section, other bellows sections can be used in other multi-conductor examples.

In some implementations, devices or systems disclosed herein can be utilized or installed using methods embodying aspects of the invention. Correspondingly, description herein of particular features or capabilities of a device or system is generally intended to inherently include disclosure of a method of using such features for intended purposes and of implementing such capabilities. Similarly, express discussion of any method of using a particular device or system, unless otherwise indicated or limited, is intended to inherently include disclosure, as embodiments of the invention, of the utilized features and implemented capabilities of such device or system.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A connector for providing a seal between a conductor and a wall of an electrical enclosure that includes an opening to receive the conductor therethrough, the connector comprising:

a sheath configured to surround the conductor along a length of the conductor; and an anchor structure internal to the sheath, the anchor structure including fastener openings arranged to receive a plurality of fasteners that extend through the wall and through material of the sheath, to couple the sheath to the electrical enclosure with the material of the sheath between the anchor structure and the wall of the electrical enclosure to provide a seal.

2. The connector of claim 1, wherein the sheath has a receiving end that includes an integrally formed tapered structure with a first tier defining a first cross-sectional area and a second tier defining a second cross-sectional area, the second cross-sectional area being larger than the first cross-sectional area; and wherein the first tier is configured to be separable from the first tier, so that:

with the first tier attached, an insertion opening of the receiving end to receive the conductor is defined by the first cross-sectional area; and with the first tier removed, the insertion opening is defined by the second cross-sectional area.

3. The connector of claim 2, wherein the first cross-sectional area defines a first oblong rectangular cross-sectional profile and the second cross-sectional area defines a second oblong rectangular cross-sectional profile.

4. The connector of claim 2, with the conductor being a first conductor, wherein the tapered structure of the receiving end is a first tapered structure in a set of tapered structures further including a second tapered structure configured to receive a second conductor in parallel with the first conductor.

5. The connector of claim 1, wherein the sheath defines an internal recess that receives the anchor structure to interpose the material of the sheath between the anchor structure and the wall of the electrical enclosure.

6. The connector of claim 5, wherein the anchor structure includes a sealing lip configured to concentrate a sealing pressure on the material of the sheath when the plurality of fasteners are tightened.

7. The connector of claim 1, wherein the sheath further includes a skirt configured to extend through the opening of the electrical enclosure.

8. The connector of claim 1, wherein the sheath includes a flexible bellows section that includes at least one corrugation.

9. The connector of claim 1, wherein the sheath further includes a peripheral protrusion arranged to provide at least one attachment surface for a sealing material to seal an interface between the conductor and the sheath.

10. The connector of claim 9, wherein the peripheral protrusion is interposed between a flexible bellows section of the sheath and a tapered receiving end of the sheath.

11. A method of providing a seal between a wall of an electrical enclosure and, selectively, one or more of a first conductor having a first conductor cross-sectional area or a second conductor having a second conductor cross-sectional area different from the first conductor cross-sectional area, the method comprising:

installing, at an opening of a wall of an electrical enclosure, a sheath with a tapering structure including a first tier having a first tier cross-sectional area and being integrally formed with a second tier having a second tier cross-sectional area, the second tier cross-sectional area being larger than the first tier cross-sectional area and the first tier being removable from the sheath to provide unobstructed access to the second tier;

extending one or more of the first conductor or the second conductor through the sheath into the interior of the electrical enclosure; and securing the sheath to the wall of the electrical enclosure with an anchor ring nested within the sheath, so that material of the sheath is compressed between the anchor ring and the wall to form a seal between the sheath and the wall.

12. The method of claim 11, wherein securing the sheath to the wall of the electrical enclosure includes securing the anchor ring with fasteners that extend through the wall and through the material of the sheath to couple the anchor ring to the wall.

13. The method of claim 12, wherein first ends of the fasteners are located within the enclosure and second ends of the fasteners do not extend to the outside of the sheath.

14. The method of claim 12, wherein the fasteners are first fasteners and wherein securing the anchor ring with the first fasteners includes engaging the first fasteners with second fasteners embedded within the anchor ring to couple the first fasteners to the sheath.

15. The method of claim 11, wherein securing the anchor ring to the wall urges a peripheral lip of the anchor ring into the material of the sheath to form the seal.

16. The method of claim 11, wherein extending the one or more of the first conductor or the second conductor through the sheath includes deforming the sheath at a corrugated portion between the anchor ring and the tapering structure, corresponding to one or more bends in the one or more of the first conductor or the second conductor.

17. The method of claim 11, further comprising:

securing a flexible sealing material at a joint between the tapering structure and the one or more of the first conductor or the second conductor to provide a water tight seal.

18. The method of claim 11, wherein installing the sheath at the opening of the electrical enclosure further includes extending an integral skirt of the sheath through the opening.

19. A method of providing a seal between a conductor with an oblong rectangular cross-section and a wall of an electrical enclosure, the method comprising:

securing a sheath of a connector to the wall of the electrical enclosure using fasteners inserted through the wall of the electrical enclosure and into the sheath, the sheath having a tapering structure including a first tier, the first tier having a first tier cross-sectional area and being integrally formed with a second tier, the second tier having a second tier cross-sectional area larger than the first tier cross-sectional area;

removing the first tier from the sheath before applying a flexible sealing material, to locate a receiving end of the sheath at the second tier, the receiving end having an oblong rectangular cross-section substantially equal in size to the oblong rectangular cross-section of the conductor;

inserting the conductor into the receiving end of the sheath; and applying the flexible sealing material around an interface between the conductor and the sheath at the receiving end to seal the interface.

* * * * *